No. 683,904.  
Patented Oct. 8, 1901.

W. J. BREWER.
VEHICLE HAVING ROLLER BEARINGS.
(Application filed Dec. 29, 1900.)

(No Model.)

4 Sheets—Sheet 1.

Witnesses  
Inventor  
W. J. Brewer  
by Wilkinson & Fisher  
Attorneys

No. 683,904. Patented Oct. 8, 1901.
W. J. BREWER.
VEHICLE HAVING ROLLER BEARINGS.
(Application filed Dec. 29, 1900.)

(No Model.) 4 Sheets—Sheet 2.

No. 683,904. Patented Oct. 8, 1901.
W. J. BREWER.
VEHICLE HAVING ROLLER BEARINGS.
(Application filed Dec. 29, 1900.)
(No Model.) 4 Sheets—Sheet 3.
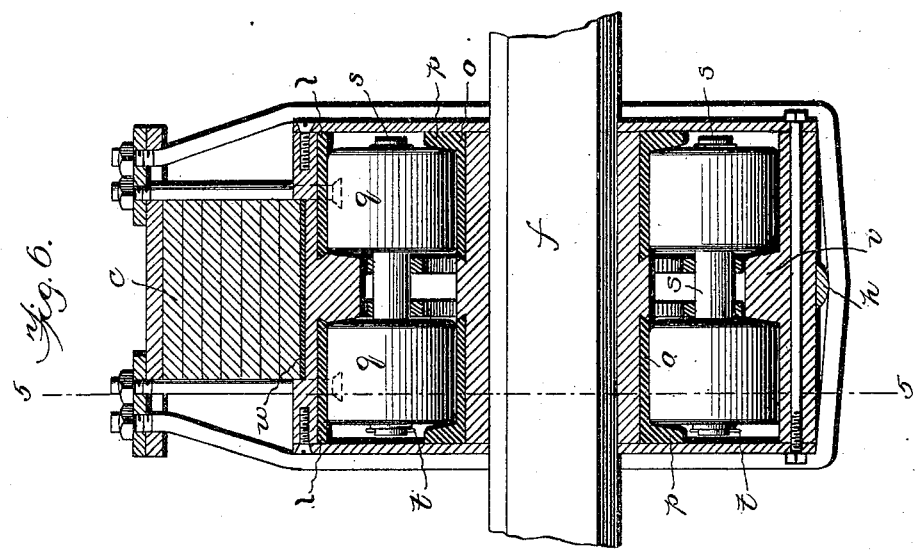
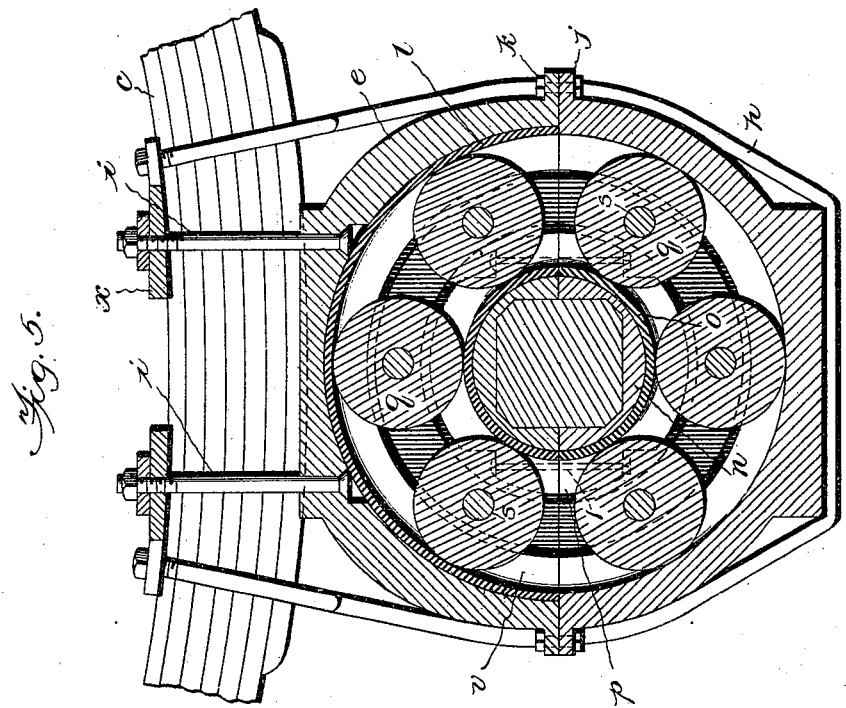
Witnesses
Inventor
W. J. Brewer
by Wilkinson & Fisher
Attorneys

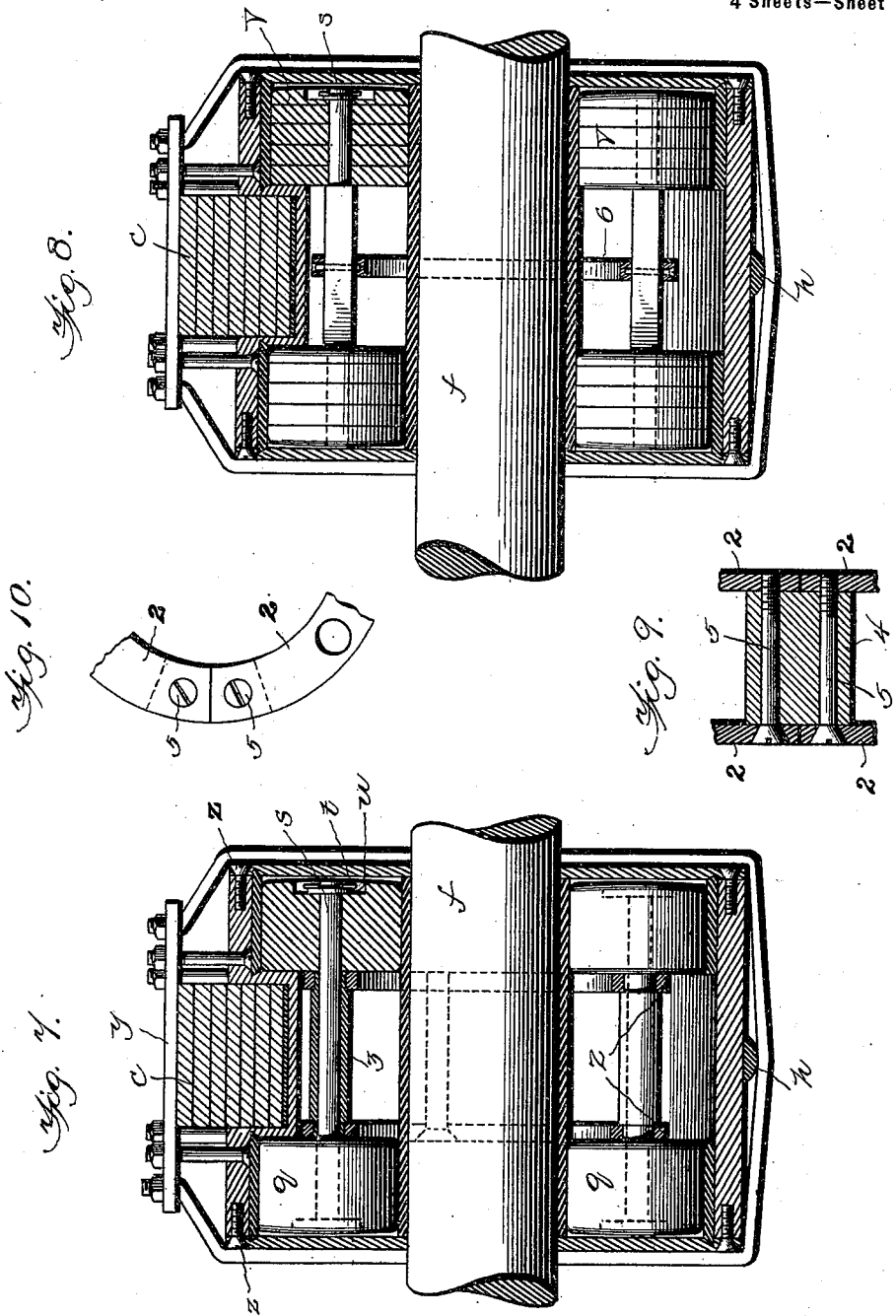

UNITED STATES PATENT OFFICE.

WILLIAM JOHN BREWER, OF WASHINGTON, DISTRICT OF COLUMBIA, ASSIGNOR TO THE NATIONAL ROLLER AND BALL BEARING COMPANY, OF SAME PLACE.

VEHICLE HAVING ROLLER-BEARINGS.

SPECIFICATION forming part of Letters Patent No. 683,904, dated October 8, 1901.

Application filed December 29, 1900. Serial No. 41,506. (No model.)

*To all whom it may concern:*

Be it known that I, WILLIAM JOHN BREWER, a subject of the Queen of Great Britain, residing at Washington, in the District of Columbia, have invented certain new and useful Improvements in Vehicles Having Roller-Bearings; and I do hereby declare the following to be a full, clear, and exact description of the invention, such as will enable others skilled in the art to which it appertains to make and use the same.

My invention relates to an improvement in vehicles having roller-bearings.

The invention may be applied to the ordinary carts or carriages in common use without especial change. In fact, it may be applied to any vehicle, and it is especially designed for this purpose. It is obvious, however, that it is not restricted to vehicles, but can be applied to any rotating body.

My invention consists in the construction and combinations of parts, as hereinafter described, and specifically set forth in the claims.

Figure 1:
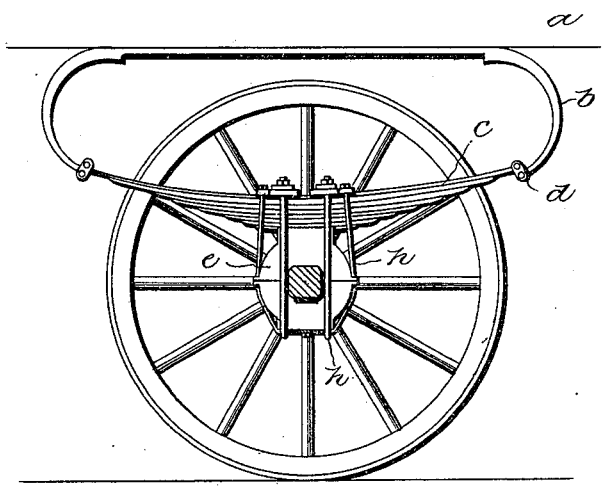
Figure 2:
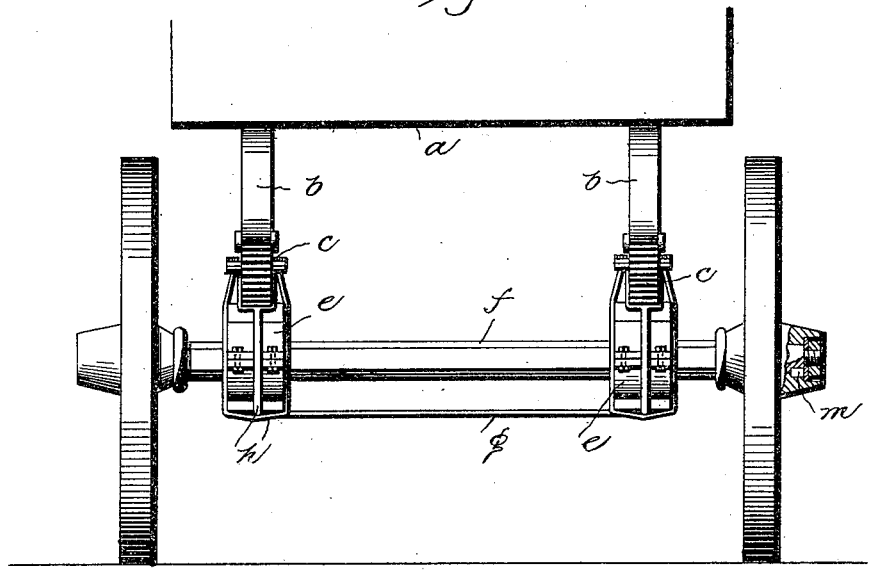
Figure 3:
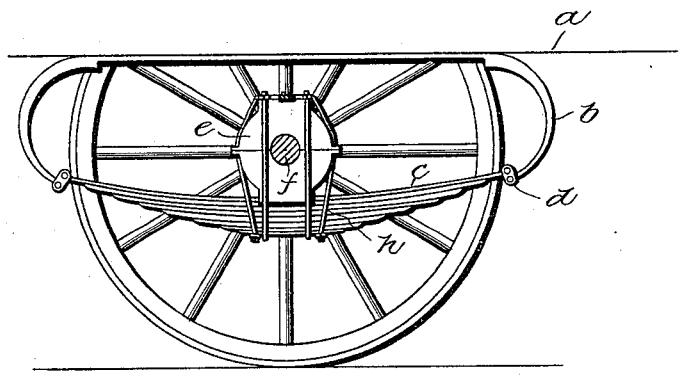
Figure 4:
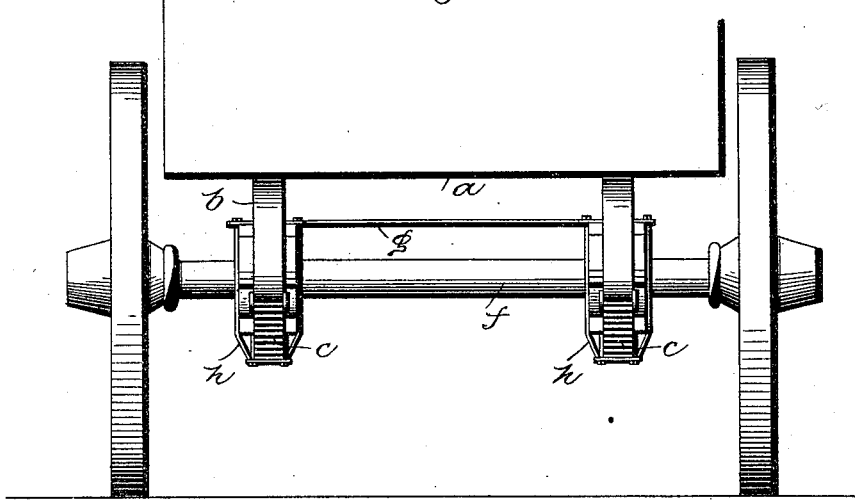

In the accompanying drawings, Figure 1 is a side view of a portion of a cart or other vehicle, showing my invention applied thereto. Fig. 2 is a rear view of the same. Fig. 3 is a side view similar to Fig. 1, but showing the spring below the axle. Fig. 4 is a rear view of the cart shown in Fig. 3. Fig. 5 is a cross-section on the line 5 5 of Fig. 6. Fig. 6 is a transverse sectional view of my improved roller-bearing. Fig. 7 is a similar transverse sectional view of my roller-bearing, but showing the spacing-thimble and one of the rollers in section. Fig. 8 is a transverse sectional view showing a modification. Fig. 9 is a sectional view through a part of the supporting-ring, showing how the ends thereof are joined together; and Fig. 10 is a side view of a portion of one of the supporting-rings.

$a$ represents the bottom of a carrier or truck, and $b$ shackle-bars, preferably curved, to which the semi-elliptic springs $c$ are attached by the links $d$. These springs $c$ are supported in journal-boxes $e$, which in turn are supported on the axle $f$. A tie-rod $g$ connects the two journal-boxes $e$, which rod is used to overcome the effect of lateral thrusts, which occur, for example, when the vehicle is traveling with one side lower than the other.

$h$ represents curved bolts nearly U-shaped, which are fastened by nuts above the springs $c$ and pass down and around the journal-boxes $e$. One of these bolts runs from side to side and two from end to end of the journal-boxes $e$, thus holding said boxes firmly in contact with the corresponding springs $c$. Shorter bolts $i$ $i$ run from the journal-boxes $e$ through or around the springs $c$ and are held by nuts above said springs $c$. The tops and bottoms of the journal-boxes $e$ are flattened for engagement with the springs $c$ and bolts $h$, respectively. The relative arrangement of the journal-boxes $e$ and springs $c$ and the supporting and fastening bolts $h$ and $i$ make a compact and almost rigid structure, keeping said springs and journal-boxes firmly together in their relative positions.

In Figs. 1 and 2 the springs $c$ are shown above the axles, and in Figs. 3 and 4 they are shown below said axles, the latter construction being especially valuable when a low wagon or cart is desired.

The journal-boxes $e$ are preferably made in two parts, as shown in Fig. 5, which parts are provided with lips $j$, connected by bolts $k$, although it is obvious that any other convenient means of making the boxes and fastening them together may be used. One or both of these halves may be provided with a steel wear-ring $l$, if desired. The box is of course hollow for the reception of the rollers.

One great advantage of this construction is that it may be applied to the axle of any cart or wagon without substantial change. For example, it may be applied to the ordinary square or rectangular axle of a cart, as shown in Fig. 5. The axle as a whole revolves, being supported by the rollers in the roller-bearing, and one of the wheels is usually fastened to the axle, as by means of the key $m$, Fig. 2, while the other wheel revolves freely on said axle, thus making it easier to turn corners.

The central part of the journal-box $e$ is provided with blocks $n$, which closely fit around the square axle shown in Fig. 5. Wear-rings o, provided with flanges p, closely encircle the blocks n, and the rollers q are supported on one side by these wear-rings o and on the other by the wear-rings l, which are located outside of the rollers q. The rollers q are preferably mounted in pairs upon axles s and are secured on said axles by pins t. Washers u are preferably used between said pins and the rollers. The journal-boxes e are provided with a central circular projection v, which projection is interposed in a continuous ring between the rollers, and which projection, together with the flanges p upon the wear-rings o, serves to keep the rollers in proper position and at right angles to the main axle. The tops of the journal-boxes e are preferably recessed for the reception of the springs c, and in the construction shown in Fig. 7 the walls of this recess extending downward into the journal-box perform the function of the circular projection b.

The axles s may be made round, with an enlarged central portion, as shown in Fig. 6, or round and of the same diameter throughout, as shown in Fig. 7, or with round ends and an enlarged square central portion, as shown in Fig. 8.

The wear-rings o and l may be dovetailed into the box to hold them in place, if necessary.

Plates w, of rolled steel or other suitable material, are interposed between the springs c and the boxes e, and plates x and y are preferably used above the springs c, through which plates the bolts h and i pass, thus preventing said bolts from injuriously affecting the springs. The ends of the journal-boxes e are preferably removable, being fastened thereto by screws z. The two halves of the journal-boxes are fastened together at their ends by means of bolts 1, (shown in dotted lines in Fig. 5,) which pass through or into the ends of the journal-box, thus firmly fastening together the end portions of the two halves of the journal-box.

The rollers q may be made solid and of any suitable material, or they may be made in disks, as shown in Fig. 8. By making them in disks, which may be left loose upon the axles s or fastened together in any suitable way, the cost of manufacture is considerably reduced.

The numeral 2 in Fig. 7 represents two parallel supporting-rings which are perforated for the passage of the axles s. These rings are spaced apart by the thimbles 3, each end of which is provided with a shoulder. The two rings 2, with the spacing-thimbles and the rollers connected together by their axles, form a complete structure, which may be removed as a whole by slipping out from the journal-box when the same is opened. It is obvious, of course, that the two halves of the journal-box may be hinged together instead of bolted, if desired.

One advantage of the construction herein shown is that the end of the journal-box may be taken off and any one of the rollers, should it happen to be worn, may be removed and replaced by a new one without taking the whole structure to pieces. This is a great desideratum from the manufacturer's standpoint in that it enables repairs to be made very quickly and cheaply.

The rings 2 have their ends fastened together, as shown in Figs. 9 and 10. If desired, each of these rings may be made in two parts, and this is the preferable method of constructing them. In Fig. 9 a block 4 of sufficient size overlaps the adjoining ends of the two halves of the parallel rings 2, and bolts 5 pass through the rings in said blocks, holding the half-rings firmly together. This is the manner of joining together the paired rings of Fig. 7 and also of the single rings 6. (Shown in Fig. 8.) In said Fig. 8 only one supporting-ring 6 is shown, and this is the simplest and cheapest construction to make. This ring 6 is made of halves, as already described. Said halves are stamped out, and in the process of stamping square holes are made at suitable intervals. The axles s (shown in Fig. 8) have a squared enlarged central portion which passes through the squared perforations in the rings 6, and screws 9 pass through said rings and through said axles, thus uniting the ring 6 firmly with all the axles s.

I have shown my improved roller-bearing as applied to a cart; but it is by no means restricted to such a use. It may be applied to any rotating body and is especially applicable to the axle-boxes of railway and street cars, as the recess in center takes up but little room and the rollers can be applied to the axle outside of the horn-plates, thus rendering it possible to use the roller-bearings on cars already in use without rebuilding the horn-plates. My invention, therefore, is of especial value to be applied to axles already constructed and where the conditions are such that little room can be given to the roller-bearings.

It is of course obvious that many changes might be made without departing from the spirit of my invention, and I wish it to be expressly understood that I do not limit myself to the exact details shown and described.

Having thus described my invention, what I claim as new, and desire to secure by Letters Patent of the United States, is—

1. The combination with a cart-body, springs carried by said body and the wheels and axles of the cart, of roller-bearings interposed between said axles and said springs, each of said roller-bearings comprising a journal-box provided with a recessed portion in which one of said springs is seated, and antifriction-rollers arranged on either side of and guided by said recessed portion, substantially as described.

2. The combination with a cart-body, springs carried by said body and the wheels and axles of the cart, of roller-bearings interposed between said axles and said springs, each of said roller-bearings comprising a two-part journal-box, provided with a recessed portion in which one of said springs is seated, antifriction-rollers arranged in pairs, one on each side of said recessed portion, and bolts for uniting the two halves of the journal-box together, substantially as described.

3. The combination with a cart-body, springs carried by said body and the wheels and axles of the cart, of roller-bearings interposed between said axles and said springs, each of said roller-bearings comprising a journal-box provided with a recessed portion, in which one of said springs is seated, antifriction paired rollers located on each side of said recessed portion and guided thereby, a plate above each of said springs and bolts passing through said plate and fastening said spring and roller-bearing together, substantially as described.

4. The combination of a cart-body, wheels and axles therefor, springs supported from said body and journal-boxes firmly attached to said springs, each of said journal-boxes being provided with a recessed portion serving for the reception of one of said springs and also serving as a guide for the rollers in said box, and being also provided with axles each carrying a pair or more of rollers, substantially as described.

5. The combination of a cart-body, wheels and axles therefor, springs supported from said body and journal-boxes firmly attached to said springs, each of said journal-boxes being provided with a central recessed portion and with axles each carrying a pair or more of rollers, and each of said boxes being further provided with means for maintaining said axles in their relative positions, substantially as described.

6. The combination of a cart-body, wheels and axles therefor, springs supported by said body and journal-boxes firmly bolted to said springs, each of said boxes being provided with a central recessed portion, with axles, each having a squared central portion and a pair of rollers, and each of said boxes being further provided with a spacing-ring attached to said axles, substantially as described.

In testimony whereof I affix my signature in presence of two witnesses.

WILLIAM JOHN BREWER.

Witnesses:
JOS. H. BLACKWOOD,
J. STEPHEN GINSTA.